US011036699B2

(12) United States Patent
Brodt (10) Patent No.: US 11,036,699 B2
(45) Date of Patent: Jun. 15, 2021

(54) METHOD FOR COMPUTING DISTINCT VALUES IN ANALYTICAL DATABASES

(71) Applicant: International Business Machines Corporation, Armonk, NY (US)

(72) Inventor: Andreas Brodt, Gerlingen (DE)

(73) Assignee: International Business Machines Corporation, Armonk, NY (US)

( * ) Notice: Subject to any disclaimer, the term of this patent is extended or adjusted under 35 U.S.C. 154(b) by 380 days.

(21) Appl. No.: 15/298,336

(22) Filed: Oct. 20, 2016

(65) Prior Publication Data

US 2018/0113886 A1 Apr. 26, 2018

(51) Int. Cl.
*G06F 16/215* (2019.01)
*G06F 16/23* (2019.01)

(52) U.S. Cl.
CPC ........ *G06F 16/215* (2019.01); *G06F 16/2365* (2019.01)

(58) Field of Classification Search
None
See application file for complete search history.

(56) References Cited

U.S. PATENT DOCUMENTS

| 5,946,681 | A  | * | 8/1999  | Shorter ............ G06F 17/30303 |
| 9,372,889 | B1 |   | 6/2016  | Jakobsson et al. |
| 9,734,221 | B2 |   | 8/2017  | Sarferaz |
| 10,387,475 | B2 |   | 8/2019  | Bhave et al. |
| 2002/0080798 | A1 | * | 6/2002  | Hariguchi ............ H04L 45/00 370/395.31 |
| 2010/0161603 | A1 | * | 6/2010  | Caceres ............ G06F 17/30539 707/736 |
| 2013/0024430 | A1 | * | 1/2013  | Gorelik ............ G06F 17/30371 707/690 |
| 2015/0088812 | A1 |   | 3/2015  | Ziauddin et al. |
| 2015/0363447 | A1 |   | 12/2015 | Dickie |
| 2016/0078023 | A1 |   | 3/2016  | Schalk |

(Continued)

FOREIGN PATENT DOCUMENTS

WO WO 2014/133982 A1 9/2014

OTHER PUBLICATIONS

List of IBM Patents or Patent Applications Treated as Related, Dec. 7, 2017, 2 pages.

(Continued)

*Primary Examiner* — Kris E Mackes
*Assistant Examiner* — Soheila (Gina) Davanlou
(74) *Attorney, Agent, or Firm* — Francis Lammes; Stephen J. Walder, Jr.; Steven M. Bouknight (57) ABSTRACT

A mechanism is provided for determining distinct values of an attribute in a data table including the attribute and data records stored in a set of data blocks. Attribute value information is provided for each data block that comprises information indicating distinct values of the attribute in the data blocks. At least part of a current data block of the data table is scanned to determine current distinct values of the attribute. The current distinct values of the attribute of the current data block are added to a list of current distinct values of the data table. The scanning and adding are repeatedly performed for a further data block of the data table if the attribute value information of the further data block indicates at least one distinct value that is not present in the list. The list of current distinct values are then provided.

18 Claims, 4 Drawing Sheets

(56) References Cited

U.S. PATENT DOCUMENTS

2016/0179896 A1* 6/2016 Finlay ............... G06F 17/30339
                                                         707/693
2016/0246827 A1* 8/2016 Deng ................ G06F 17/30138

OTHER PUBLICATIONS

"Database Data Warehousing Guide", Oracle, http://docs.oracle.com/database/121/DWHSG/zone_maps.htm, 12c Release 1 (12.1), Jul. 2014, 25 pages.

Bloom, Burton H., "Space/Time Trade-offs in Hash Coding with Allowable Errors", ACM, Communications of the ACM, vol. 13, No. 7, Jul. 1, 1970, pp. 422-426.

Brodt, Andreas et al., "Hybrid Value Range Synopsis in Analytical Databases", U.S. Appl. No. 15/161,396, filed May 23, 2016.

Brodt, Andreas, "Method for Computing Distinct Values in Analytical Databases", IBM Corporation, IBM Germany Research and Development, Apr. 4, 2016, 7 pages.

Brodt, Andreas et al., "Self-Optimizing Value Range Synopis in Analytical Databases", IBM Corporation, IBM Germany Research and Development, Nov. 5, 2015, 11 pages.

Chainani, Naresh et al., "DB2 with BLU Acceleration: A rapid adoption guide", IBM Corporation, http://www.ibm.com/developerworks/data/library/techarticle/dm-1309db2bluaccel/dm-1309db2bluaccel-pdf.pdf, developerWorks, May 7, 2015, 15 pages.

* cited by examiner

METHOD FOR COMPUTING DISTINCT VALUES IN ANALYTICAL DATABASES

BACKGROUND

The present invention relates to the field of digital computer systems, and more specifically, to a method for determining distinct values of an attribute in a data table.

Analytical database systems manage very large amounts of data and are optimized for queries that must read large portions of it. At the same time, they offer the complete querying power of SQL. As such systems do not focus on online transaction processing (OLTP) load they typically do not index each data row but heavily rely on scan performance. This may be even more challenging for identifying distinct values in such analytical databases.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system, is provided for determining distinct values of an attribute in a data table, the data table including the attribute and data records of the data table stored in a set of data blocks, attribute value information being provided for each data block, the attribute value information comprising information indicating distinct values of the attribute in the data blocks. The illustrative embodiment scans at least part of a current data block of the data table and determining current distinct values of the attribute in the current data block. The illustrative embodiment adds the current distinct values of the attribute of the current data block to a list of current distinct values of the data table. The illustrative embodiment repeatedly performs the scanning and adding for a further data block of the data table as the current data block if the attribute value information of the further data block indicates at least one distinct value that is not present in the list. The illustrative embodiment then provides the list of current distinct values.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

In the following embodiments of the invention are explained in greater detail, by way of example only, making reference to the drawings in which.

DETAILED DESCRIPTION

The descriptions of the various embodiments of the present invention will be presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The attribute value information may be descriptive of the attribute. In one example, the attribute value information may further comprise the maximum and minimum values of the attribute. Using the attribute value information a preselection of data blocks of the data table may be performed before scanning the preselected data blocks. The attribute value information may comprise information or metadata on the attribute that allows such a preselection. For example, the maximum and the minimum attribute values of the attribute define a first range of values of the attribute in a respective first data block. For example, a received data query may require a second range of values of the attribute. The processing of the data query may comprise selecting data blocks of the data table whose respective first range overlap with the second range and processing those selected data blocks (that forms a scan list).

The intention of attribute value information is to identify data blocks that—due to their value range—cannot contain any rows that match the query predicates. This allows computing a scan list for the query that contains fewer data blocks than a full table scan and is thus capable of reducing I/O and predicate evaluation workload drastically—without needing full-blown and maintenance-intensive indexes.

Ideally, the system only needs to consult the attribute value information once, compute an optimal scan list, and process the respective data blocks. This is, however, only possible if the data blocks are guaranteed to contain all values that are listed in their attribute value information. Often, this may not be the case. As the system may not update the attribute value information when values are deleted. Thus, it is still true that no values are contained in the data blocks that are not reflected by the attribute value information. But the reverse may be possible, i.e., some values may be missing. In such a scenario, one may not assume that a certain value has been read after a data block has been scanned, as the value may have been deleted.

In addition to that, the query may have other restrictions on the data such as the following query containing a WHERE clause or joins, that lists the brand names of products bought by teen age customers:

SELECT DISTINCT p.brandName

FROM product p NATURAL JOIN sales s NATURAL JOIN customer c
WHERE cage<=18.

Thus, even if the data blocks did contain all values listed in the attribute value information, some of them may have been eliminated by other operations e.g. the query might not select them, because the respective rows are filtered out in the WHERE clause, don't find a JOIN partner etc.

To address this, the present method provides an iterative approach. First, a few data blocks may be scanned and the set of distinct values scanned so far may be computed. Then the remaining scan list may be pruned by eliminating all data blocks that only contain values that have already been scanned. The scan may continue and process a subset of the pruned scan list, and then again one may eliminate data blocks that cannot contribute new values, and so forth. This process is repeated until the remaining scan list is empty.

In order to reduce the amount of duplicates to process in order to compute a set of distinct values, the present method may exploit the knowledge about the values of data blocks that is available from attribute value information. Attribute value information may comprise the smallest and largest value for a column or attribute c across all rows stored in a particular data block and may also contain more information up to the complete list of distinct values of attribute c. Exploiting this information, one can restrict the scan list to data blocks that are capable of contributing new values to the set of distinct values scanned so far. Data blocks that will only provide duplicates to values that have already been seen can be skipped. This way, analytic systems can efficiently deal with huge amounts of data. Assuming a particular set of distinct values is small (e.g., brand names), there could still be enormous amounts of rows that carry those values. Thus, the amount of duplicates is extremely high in this case. The state-of-the-art method to compute the set of distinct values is to produce all values and first and then eliminate duplicates. At this, duplicate elimination can become extremely expensive. If the system does not have an index on the respective column there are typically only two ways to eliminate duplicates: either all values have to be sorted or all values have to be checked against a hash table. What would be desirable is that only those rows of the table were being read that are capable of contributing new values to the result. This would save the system lots of work and avoid processing the same known values over and over again.

In the present method the attribute value information contains information indicate the distinct values within the corresponding data block. Using the information on distinct values in attribute value information it may be determined, which data blocks may contain further distinct values. Only data blocks that may contain further distinct values may selectively be read. This reduces the number of possible duplicates and makes the duplicate elimination a lighter task (than in the prior-art method to determine distinct values).

According to one embodiment, the adding of the current distinct values to the list further comprises updating the attribute value information of the first data block using the current distinct values. This may keep the attribute value information up to date which may increase query performance.

According to one embodiment, the method further comprises repeatedly performing the scanning and adding for a predefined part of data blocks of the data table.

The predefined part of data blocks of the data table may be user defined. For example, the user may define a maximum number of data blocks of the data table for which the distinct values may be determined. This embodiment may save processing resources that would otherwise be required by considering all data blocks of the data table.

According to one embodiment, the attribute value information further comprises the maximum and minimum values of the attribute, the predefined part of data blocks of the data table comprises a scan list, wherein the scan list comprises data blocks of the data table whose attribute value information indicate a range of values of the attribute that overlaps a received query range on the attribute.

For example, the received query may require determining distinct values of the attribute only for the query range. This embodiment may make use of a rich content of the attribute value information for serving complex queries.

According to one embodiment, in each repetition: sorting a predefined set of data blocks of the data table that are not yet processed in descending order from a top to a bottom as a function of number of distinct values of each data block that are different of the current distinct values of the list; selecting the further data block as the first ordered data block. This may further reduce the number of data blocks to be processed and thus may further save processing resource compared to the case where no ordering is performed.

According to one embodiment, the predefined set of data blocks comprises remaining data blocks of the data table that are not yet processed.

In another example, the predefined set of data blocks may comprise a maximum number of data blocks of the data table. For example, the maximum number of data blocks may be randomly selected from the data blocks of the data table. This may be advantageous for test purpose requiring representative results, where the whole data table may not be required.

According to one embodiment, the scanning of the second data block comprises: in response to determining using the attribute value information of the second data block that number of extra distinct values of the second data block that are different of the current distinct values of the list is smaller than a predefined threshold number, determining a selection operation requesting only the extra distinct values of the second data block; scanning the second data block for evaluating the selection operation; otherwise scanning the second data block for identifying current distinct values of the second data block. This embodiment may be advantageous as it may prevent scanning the whole data blocks to find fewer distinct values. For example, in the threshold number may be a value of 2. In this case, a condition on a single value such as attribute=value can be evaluated faster and much cheaper than scanning the full data block.

According to one embodiment, the adding of the current distinct values of the attribute of the first data block to the list comprises adding only values of the current distinct values of the attribute of the first data block that are not part of the list. This may prevent having duplicates in the list.

According to one embodiment, the method further comprises storing the list in a main memory. This may speed up the processing as the list may be read faster on the main memory.

According to one embodiment, the attribute value information further comprises the minimum and maximum values of the attribute, wherein the attribute is an enumerable type, wherein determining that the attribute value information of the further data block indicate distinct values that are not all present in the list comprises: identifying one or more ranges of coherent values that are completely covered in the current distinct values of list; determining that the further data block has a range of values of the attribute (determined by the minimum and maximum values of the attribute) that partially overlaps at least one of the identified ranges or that the range of the further data block is not part of the identified ranges. This may be advantageous as it may make use of other information (namely the minimum and maximum values) rather than the distinct values themselves to be part of the attribute value information. For example, the very first data block to be processed may have attribute value information that comprise the distinct values of the attribute; however, the remaining data blocks to be processed may have the minimum and maximum values of the attribute as part of the attribute value information. For example, data blocks b1-b9 to be processed in that order b1 to b9, a first set of data blocks e.g. b1-b5 may have the attribute value information comprising the distinct values of the attribute while the other data blocks b6-b9 may have the attribute value information comprising the minimum and maximum values of the attribute. The method of this embodiment may be executed for data blocks b6-b9. The method may provide a means such as a flag that can detect which kind of information a data block has, and if it detects that data block e.g. b2 has the distinct values in the attribute value information the method described above may be used by comparing the distinct values of block b2 and the distinct values of the list; however, if the method detects that a data block e.g. b7 has the minimum and maximum values in the attribute value information the method of this embodiment may be performed.

According to one embodiment, the method further comprises: providing a bloom filter technique for determining attribute value information of data blocks of the data table; wherein determining the attribute value information for each data block of the data table comprises encoding each value of the attribute of the each data block into one or more bits of a bit vector, wherein the attribute value information further comprises the bit vector; in response to determining that the further data block has a range of values of the attribute that partially overlaps at least one of the identified ranges, determining that at least one of the remaining non-overlapping values in the range of values of the further data block exists in the bit vector of the further data block. In response to determining that none of the remaining non-overlapping values in the range of values of the further data block exists in the bit vector of the further data block skipping the further data block without repeating the scanning and adding steps.

The bit vector provides a data structure (of the Bloom Filter) that can be used to test if some element is a member of attribute values that are encoded in the bit vector. For example, the bit vector or bit array may comprise m bits all initially set to 0. There may also be k (k>=1) different hash functions defined, each of which maps or hashes some set element (attribute value) to one of the m vector positions e.g. with a uniform random distribution. To add an element or attribute value, the attribute value may be feed to each of the k hash functions to get k vector positions whose bits are then all set to 1. To query for an element (test whether it is in the set of inserted elements in the bit vector), that element may be feed to each of the k hash functions to get k array positions. If any of the bits at these positions is 0, the element is definitely not in the set—If all the bits at these positions are 1, then the element may be in the set.

This embodiment may further decrease the number of unnecessary scanned data blocks.

According to one embodiment, the attribute value information of a data block further comprises empty ranges of values of the attribute in the data block, in response to determining that the further data block has a range of values of the attribute that partially overlaps at least one of the identified ranges, determining that at least one of the remaining non-overlapping values if not within the empty ranges of the further data block. If remaining non-overlapping values are all within the empty ranges then the further data block may be skipped. Empty range is a range of values of the attribute that is not part of a data block. This embodiment may further decrease the number of unnecessary scanned data blocks.

Figure 1:
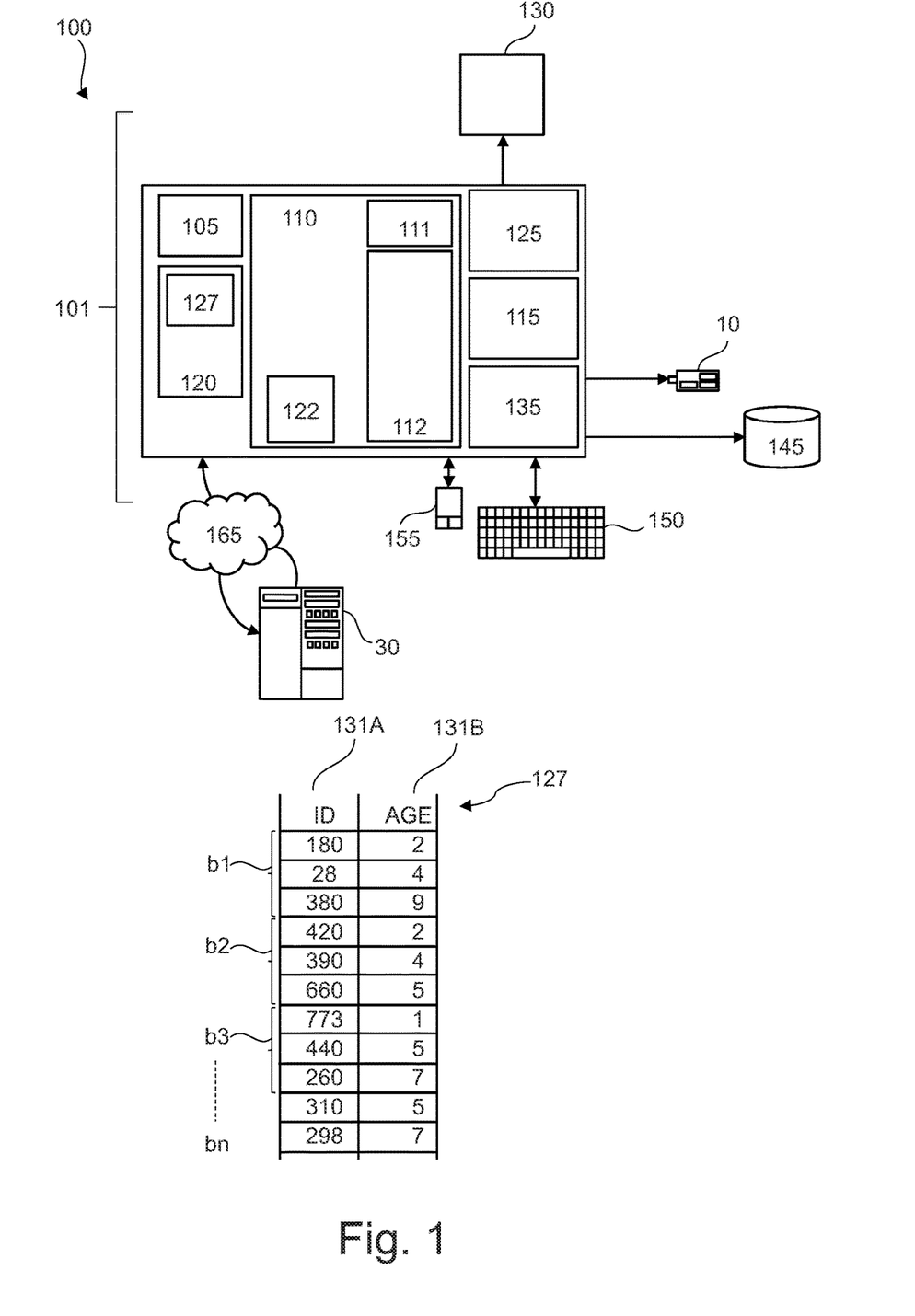
FIG. 1 represents a computerized system, suited for implementing one or more method steps as involved in the present disclosure.

FIG. 1 represents a general computerized system, suited for implementing method steps as involved in the disclosure.

It will be appreciated that the methods described herein are at least partly non-interactive, and automated by way of computerized systems, such as servers or embedded systems. In exemplary embodiments though, the methods described herein can be implemented in a (partly) interactive system. These methods can further be implemented in software 112, 122 (including firmware 122), hardware (processor) 105, or a combination thereof. In exemplary embodiments, the methods described herein are implemented in software, as an executable program, and is executed by a special or general-purpose digital computer, such as a personal computer, workstation, minicomputer, or mainframe computer. The most general system 100 therefore includes a general-purpose computer 101.

In exemplary embodiments, in terms of hardware architecture, as shown in FIG. 1, the computer 101 includes a processor 105, memory (main memory) 110 coupled to a memory controller 115, and one or more input and/or output (I/O) devices (or peripherals) 10, 145 that are communicatively coupled via a local input/output controller 135. The input/output controller 135 can be, but is not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components. As described herein the I/O devices 10, 145 may generally include any generalized cryptographic card or smart card known in the art.

The processor 105 is a hardware device for executing software, particularly that stored in memory 110. The processor 105 can be any custom made or commercially available processor, a central processing unit (CPU), an auxiliary processor among several processors associated with the computer 101, a semiconductor based microprocessor (in the form of a microchip or chip set), a macroprocessor, or generally any device for executing software instructions.

The memory 110 can include any one or combination of volatile memory elements (e.g., random access memory (RAM, such as DRAM, SRAM, SDRAM, etc.)) and non-volatile memory elements (e.g., ROM, erasable programmable read only memory (EPROM), electronically erasable programmable read only memory (EEPROM), programmable read only memory (PROM). Note that the memory 110 can have a distributed architecture, where various components are situated remote from one another, but can be accessed by the processor 105.

The software in memory 110 may include one or more separate programs, each of which comprises an ordered listing of executable instructions for implementing logical functions, notably functions involved in embodiments of this invention. In the example of FIG. 1, software in the memory 110 includes instructions or software 112 e.g. instructions to manage databases such as a database management system.

The software in memory 110 shall also typically include a suitable operating system (OS) 111. The OS 111 essentially controls the execution of other computer programs, such as possibly software 112 for implementing methods as described herein.

The methods described herein may be in the form of a source program or software 112, executable program or software 112 (object code), script, or any other entity comprising a set of instructions 112 to be performed. When a source program, then the program needs to be translated via a compiler, assembler, interpreter, or the like, which may or may not be included within the memory 110, so as to operate properly in connection with the OS 111. Furthermore, the methods can be written as an object oriented programming language, which has classes of data and methods, or a procedure programming language, which has routines, subroutines, and/or functions.

In exemplary embodiments, a conventional keyboard 150 and mouse 155 can be coupled to the input/output controller 135. Other output devices such as the I/O devices 145 may include input devices, for example but not limited to a printer, a scanner, microphone, and the like. Finally, the I/O devices 10, 145 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The I/O devices 10, 145 can be any generalized cryptographic card or smart card known in the art. The system 100 can further include a display controller 125 coupled to a display 130. In exemplary embodiments, the system 100 can further include a network interface for coupling to a network 165. The network 165 can be an IP-based network for communication between the computer 101 and any external server, client and the like via a broadband connection. The network 165 transmits and receives data between the computer 101 and external systems 30, which can be involved to perform part or all of the steps of the methods discussed herein. In exemplary embodiments, network 165 can be a managed IP network administered by a service provider. The network 165 may be implemented in a wireless fashion, e.g., using wireless protocols and technologies, such as WiFi, WiMax, etc. The network 165 can also be a packet-switched network such as a local area network, wide area network, metropolitan area network, Internet network, or other similar type of network environment. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 101 is a PC, workstation, intelligent device or the like, the software in the memory 110 may further include a basic input output system (BIOS) 122. The BIOS is a set of essential software routines that initialize and test hardware at startup, start the OS 111, and support the transfer of data among the hardware devices. The BIOS is stored in ROM so that the BIOS can be executed when the computer 101 is activated.

When the computer 101 is in operation, the processor 105 is configured to execute software 112 stored within the memory 110, to communicate data to and from the memory 110, and to generally control operations of the computer 101 pursuant to the software. The methods described herein and the OS 111, in whole or in part, but typically the latter, are read by the processor 105, possibly buffered within the processor 105, and then executed.

When the systems and methods described herein are implemented in software 112, as is shown in FIG. 1, the methods can be stored on any computer readable medium, such as storage 120, for use by or in connection with any computer related system or method. The storage 120 may comprise a disk storage such as HDD storage.

The storage 120 may comprise at least one data table (or data set) 127. For example, the software 112 may receive (automatically or upon request) as input the data table 127, or may download the data table 127 from storage 120 or memory 110.

The data table 127 may comprise one or more columns 131A-B, wherein each column is represented by a respective attribute (e.g. "ID" 131A and "Age" 131B). The rows of the data table 127 may comprise values of the attributes 131A-B. The data table 127 may for example comprise or may be stored on multiple (e.g. contiguous) data blocks b1-bN.

The term "data block" as used herein may refer to a logical or physical storage for storing the data of the data table.

For example, as illustrated in FIG. 1 the data table 27 may be divided or split or assigned to data blocks b1-bN using the number of rows in the data table 127.

In another example, the data table 127 may be split or divided based on storage size such that each data block b1-bN contains or is assigned to one or more storage units e.g. data pages. The term "storage unit" as used herein is intended to refer to the minimum addressable unit (e.g. by software 112) in order to store the data table 127. The size of a storage unit may be an integer multiple of the size of a disk unit. The size of the storage unit may be user defined. For example, each storage unit (e.g. data page) may correspond to a specific number of bytes of physical database space on disk (e.g., 4 KB). Other storage units having different granularities may be addressable or used in order to store data e.g. in the storage 120. For example, other storage levels may comprise containers and extents, wherein extents can be defined in term of number of data pages, while a container can be determined in term of number of extents.

The rows of each data block e.g. b1 of the data table 127 may be stored on contiguous, linked, or indexed disk units (e.g. of storage 120) that form the corresponding data pages of the data block b1. The term disk unit refers to the minimum addressable unit on storage 120. For example, a disk unit may have a size of 512 bytes. The data blocks b1-bN may or may not comprise the same number of data pages.

The term "data table" or data set as used herein refers to a collection of data that may be presented in tabular form. Each column in the data table may represent a particular variable or attribute. Each row in the data table may represent a given member, record or entry of the data table.

Each data block b1-bN may be associated with attribute value information. For example, the attribute value information may be saved together with the data block to which it is associated (which is an indication that they both correspond to each other). In another example, the attribute value information may be stored (e.g. in a table) separately from the associated data block and having pointers/addresses or links to the associated data block.

While FIG. 1 only shows a few attributes and data blocks, it will be appreciated that numerous attributes and/or data blocks may exist or may be used.

Figure 2:
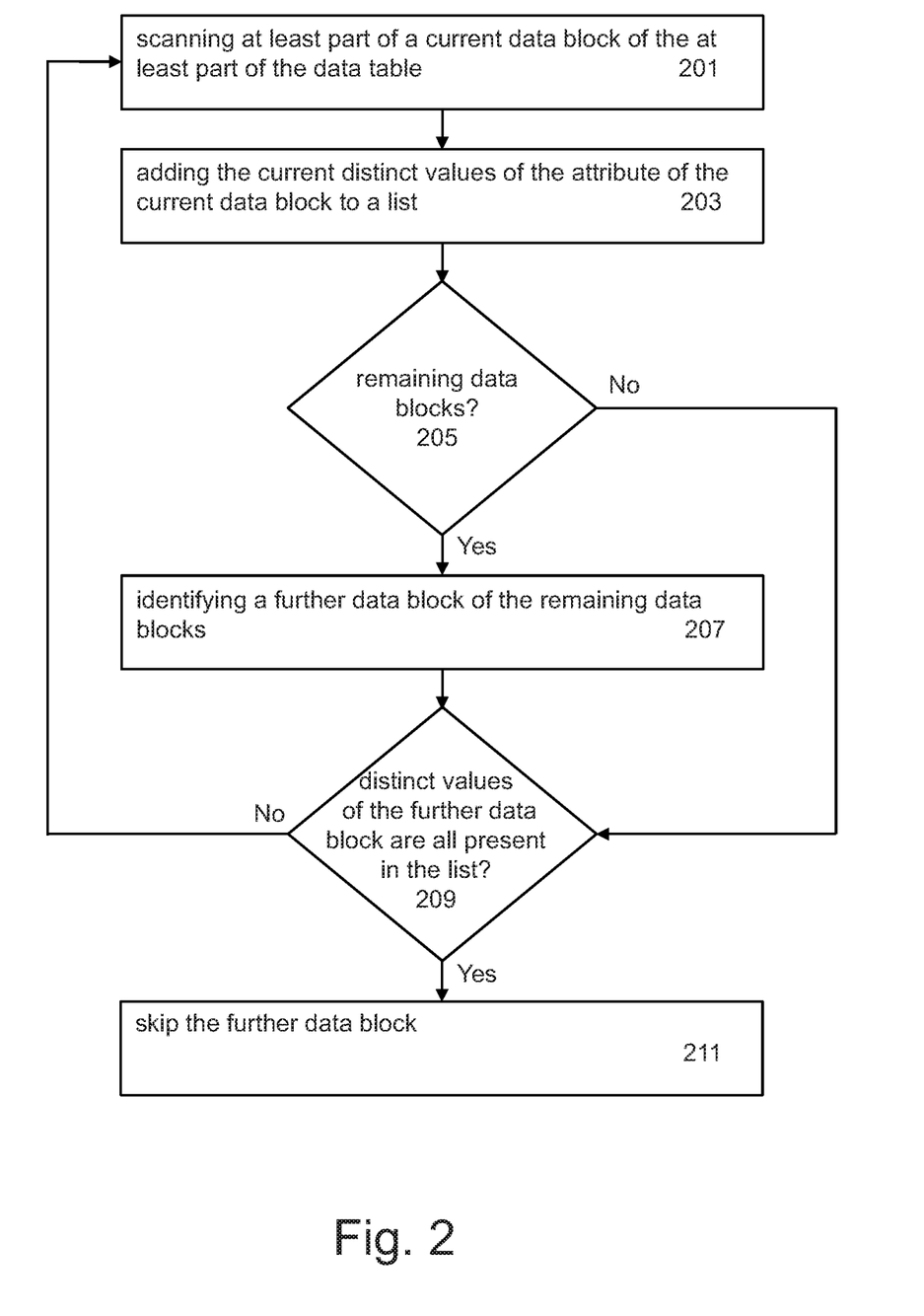
FIG. 2 is a flowchart of a method for determining distinct values of an attribute in a data table.

FIG. 2 is a flowchart of a method for determining distinct values of an attribute e.g. 131B for at least part of the data table e.g. 127. For example, the at least part of the data table 127 may comprise data blocks of the data table that form a scan list selected from the data blocks of the data table e.g. for satisfying a range query. In another example, the at least part of the data table 127 may comprise a set of data blocks that are defined or selected by the user e.g. for analysis test purpose. Assuming for exemplification purpose that the at least part of the data table 127 comprises data blocks b1-b9.

The content of data blocks b1-bN as described above may change over time. The change of a data block b1-bN in this example comprises a deletion of one or more records of the data block. For example, if a data block is changed then the number of distinct values in that data block may be smaller or equal than the number of distinct values indicated in the attribute value information in that data block. Thus, there may be a need to scan data blocks to get the current distinct values. The scanning would make use of the attribute value information to reduce the number of scanned data blocks.

In step 201, at least part of a current data block of the at least part of the data table may be scanned for determining current distinct values of the attribute in the first data block. For example, if the attribute value information indicates that a single distinct value e.g. X at most can be found in the current data block then a selection condition such as find a record having attribute=X may be performed when scanning the data block. In this case, the data block may not be fully scanned but only a part of it until the first record having attribute=X is found.

When step 201 is initially performed the first time on the data blocks b1-b9, the current data block may be randomly selected among the data blocks b1-b9 of the at least part of the data table 127. For example, the initial or very first data block to be processed may be data block b1 and the following data block to be processed may also be randomly chosen. In another example, the data blocks b1-b9 may be ranked based on the number of distinct values they contain e.g. b1 has the highest number of distinct values, followed by b2, b3 and so one In this case the data blocks may be processed in that order e.g. starting from b1, b2 up to b9.

In step 203, the current distinct values of the attribute 131B of the current data block b1 may be saved. For example, a list may be created that comprises those current distinct values of the data table. The list may for example be stored in memory 110 so as to make access to current values faster.

In inquiry 205 it may be determined if there are still remaining data blocks of the at least part of the data table other than the ones previously processed. If in inquiry 205 there are still remaining data blocks of the at least part of the data table other than the ones previously processed, a further data block of the remaining data blocks b2-b9 may be determined or identified in step 207. For example, for the first repetition the further data block e.g. b2 may be randomly selected among the remaining data blocks b2-b9. For the second repetition the further data block may be randomly selected among the remaining data blocks b3-b9 and so on. If in inquiry 205 there no remaining data blocks of the at least part of the data table other than the ones previously processed, the operation moves to step 209.

In inquiry 209 it may be determined if distinct values of the further data block that are indicated in the attribute value information are all present in the list or not. For example, if the further data block is b2 then it may be determined if all values 2, 4 and 5 are part of the list or not. For example, in case of the first repetition and the current data block that has been initially processed is b1, then the list may comprise values: 2, 4 and 9 which indicates that values 2, 4 and 5 of b2 are not all contained in the list.

If in inquiry 209 at least one distinct value of the further data block that is indicated in the attribute value information is not present in the list, steps 201-207 may be repeated for the further data block being the current data block.

If in inquiry 209 distinct values of the further data block that are indicated in the attribute value information are all present in the list, the further data block may be skipped without need to scanning it as its distinct values are already known in the list. In this case the further data block e.g. b2 may be considered as being processed and remaining data blocks to be processed may exclude it e.g. b3-b9 may be the remaining data blocks of the scan list. In this case, the further data block b2 may be pruned from the scan list of the data blocks b1-b9.

In step 211, the list of current distinct values may be provided as the distinct values of the at least part of the data table.

Figure 3:
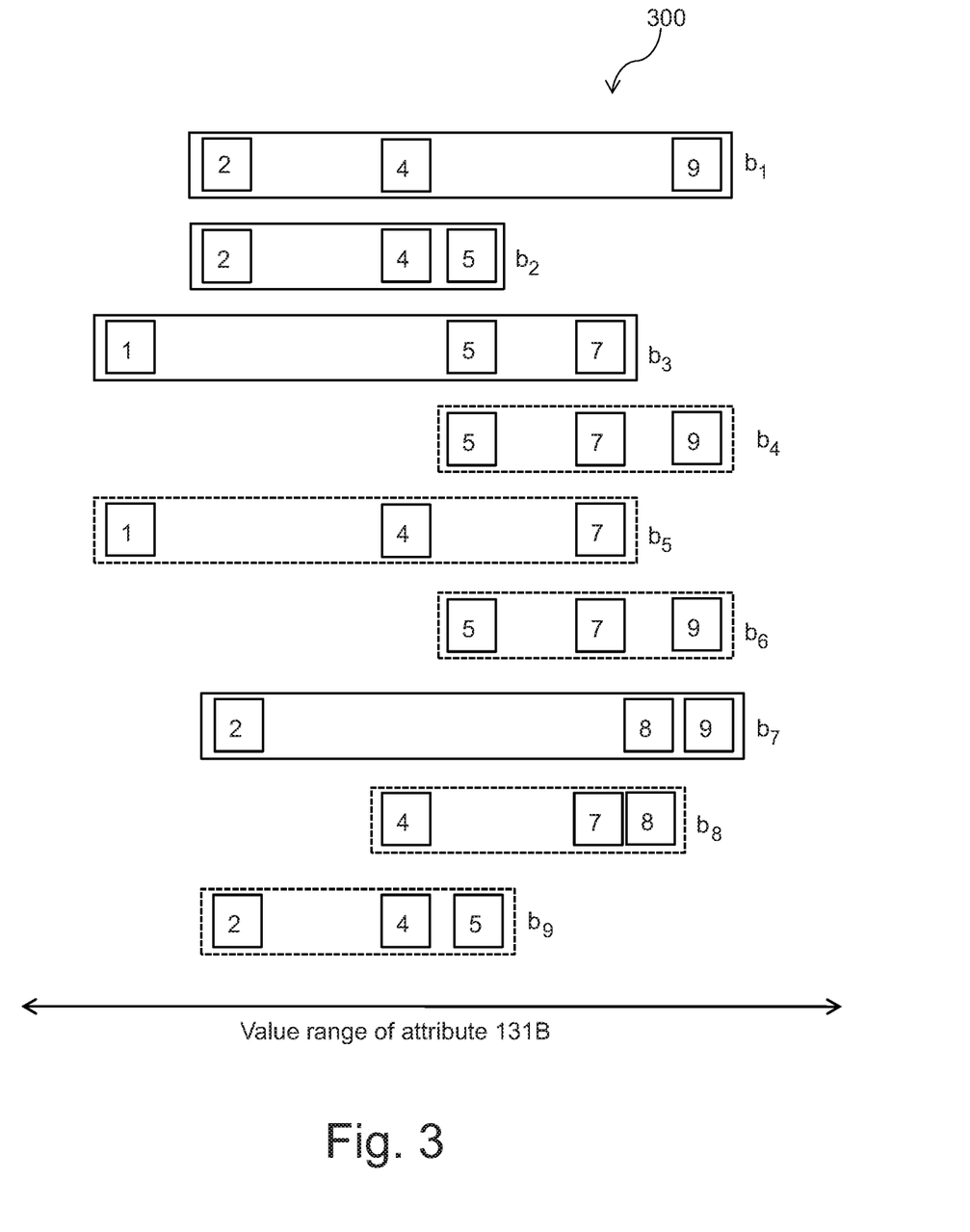
FIG. 3 illustrates an exemplary scan list.

FIG. 3 illustrates an exemplary scan list 300. The scan list 300 may comprise data blocks b1 to b9 whose attribute value information indicate ranges within 1 to 9 of attribute 131B.

The data blocks b1 . . . b9 carry values of attribute 131B between 1 and 9. Obviously, there is a large number of duplicates, as each data block could contain thousand rows or more. Thus, to compute the distinct values for attribute 131B that occur in the depicted data blocks b1-b9, the attribute value information may be used. Since the attribute value information contain the information which values occur in which data block, then the present method as described with reference to FIG. 2) is capable of excluding data blocks b4 . . . b6 and b8 . . . b9. Thus, a lot fewer rows are processed in the first place, which means less I/O and less processing cost. But most notably it requires a lot less costly duplicate elimination to compute the same result.

In one example, the data blocks b1-b9 may be processed in a sequence that attempts to read as many distinct values as early as possible. In the example of FIG. 3, b3 may be scanned before b2. According to the attribute value information, data blocks b1 and b3 contain all values to be found in b2. If the values in the attribute value information are guaranteed to exist, then only b1, b3, and b7 need to be scanned. Otherwise, one should nevertheless start with these three data blocks as the initial set of data blocks and then continue the iterative process described above.

Figure 4:
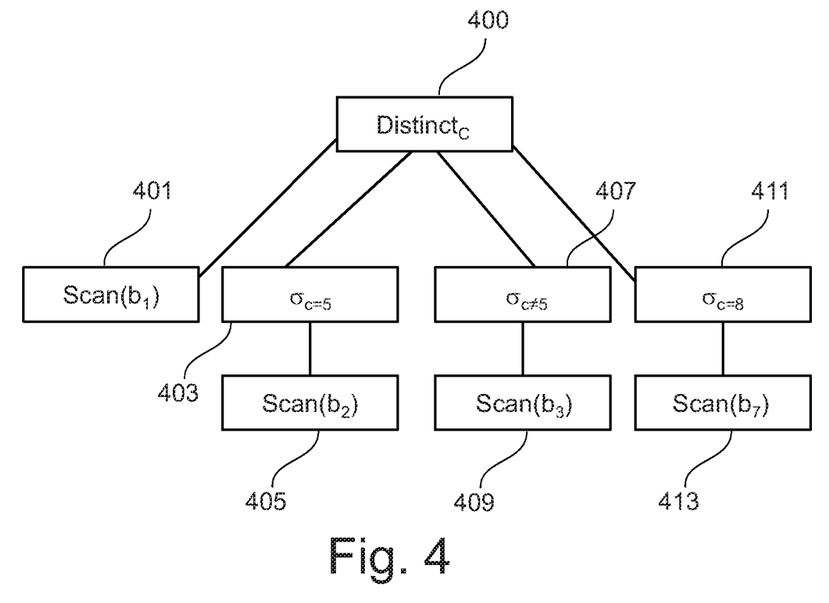
FIG. 4 depicts an execution plan computing the distinct values from the data blocks of FIG. 3.

FIG. 4 depicts an execution plan computing the distinct values from the data blocks of FIG. 3. This method may enable an early duplicate filtering.

If the number of distinct values of an attribute is low, then it is quite probable that duplicates may be read even from data blocks that do contain new values. For example, data block b7 in FIG. 3 is only read because it contains the value 8. Its other values, 2 and 9 are already known at this point because data blocks b1-b3 have been scanned. In order to reduce the number of duplicates to process, filters (selection operators, denoted by σ) may be introduced right after the scan for example when scanning data block b7 a condition may be verified according to which a record of data block b7 has c=8, where c refers to attribute 131B. The filters reject all values (e.g. records are skipped not scanned) that are not in a value range of interest. For example, a range predicate such as "<10" or "BETWEEN 0 AND 94" or an equality predicate may be a lot more efficient than a full duplicate elimination.

After scanning 401 the first data block b1 which may not contain all distinct values listed in the attribute value information because of updates of b1 etc., for example assuming the data blocks b2-b9 do contain all values listed in the attribute value information, then this plan of FIG. 4 eliminates all values from later data blocks that have been read from earlier data blocks already. This causes fewer rows to reach the distinct operator 400, which is usually more expensive to than a simple selection.

For example, following the order in which the data blocks b1-b9 have been scanned in FIG. 3, namely b1→b2→b3→b7, after scanning 401 data block b1 for determining that it comprises distinct values 2, 4 and 9, wherein the attribute value information of b1 may comprise at least values 2, 4 and 9 e.g. 2, 4, 9 and 6 where value 6 may have been deleted in the meantime from b1. Thus the values 2, 4 and 9 are the current distinct values of data block b1.

For data blocks b2, b3 and b7, it may be assumed that they contain all distinct values listed in their attribute value information. Thus, for data block b2 a selection condition 403 c=5 may be required when scanning 405 b2 because values 2 and 4 are already found. For data block b3 a selection condition 407 c≠5 may be required when scanning 409 data block b3 as the value 5 is the only one found before in data block b2. For data block b7 a selection condition 411 c=8 may be required when scanning 413 b8 because values 2 and 9 are already found in data block b1.

In the example of FIG. 4, a single operator 400 is used to identify the distinct values of data blocks b1-b9. The operator 400 is defined by a combination of the selection conditions 403, 407 and 411 and scanning operators 401, 405, 409 and 413, wherein the conditions 403, 407 and 411 are verified when executing the respective scanning operators 405, 409 and 413. For example, after processing each of the data blocks b2, b3 and b7 the records that satisfy the selection conditions 403, 407 and 411 respectively are given as input to the operator 400 such that it can find the distinct values. For data block b1, all records of b1 are given as input to the operator 400 for determining the distinct values. In one example, the operator 400 may indicate the order in which the scanning operators may be executed namely, 401, 405, 409 and then 413. For example, the conditions 403, 407 and 411 may all be defined after processing the data block b1 using the attribute value information. In another example, each of the conditions 403, 407 and 411 may be defined when starting the process of the respective data block b2, b3 and b7. In another example, the processing (including the scanning and the condition evaluation) of data blocks b2-b9 may be defined and executed in parallel e.g. the scanning 405, 409 and 413, may be executed in parallel after scanning 401, wherein each scanning 405, 409 and 413 evaluates its respective condition 403, 407 and 411.

If the data blocks b2-b9 cannot be assumed to contain all values listed in the attribute value information, then the iterative approach described above can be employed for data blocks b2-b9. To create the plan of FIG. 4, one iteration may be executed for each data block.

In another example, this early duplicate filtering can also be employed if not all distinct values of the data blocks are known a-priori (see below). It can be employed as soon as a certain value range r overlapping with a particular data block b are known to have been completely processed, meaning every possible value in r is already in the result set. Rows from b carrying values in r can be filtered out early, as they are known not to contribute any new distinct values to the result.

Figure 5:
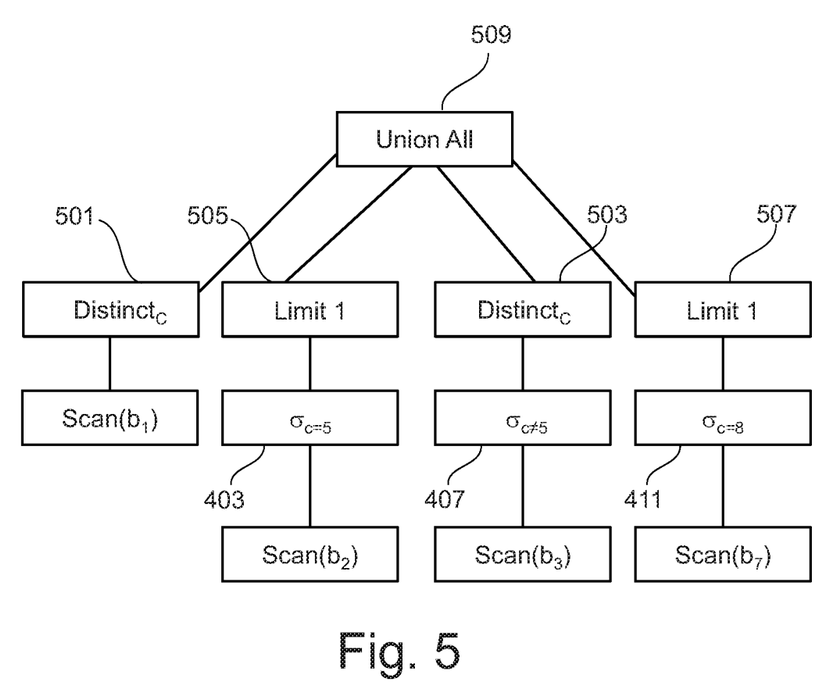
FIG. 5 depicts another execution plan computing the distinct values from the data blocks of FIG. 3.

FIG. 5 depicts another execution plan computing the distinct values from the data blocks of FIG. 3.

The present method attempts to avoid reading the same values (from different rows and data blocks) repeatedly as it is the case of FIG. 4, where for example the operator 400 receives all rows that satisfy condition attribute=5. Particularly in combination with early duplicate filtering, as described in FIG. 4, this may result in fully disjoint sets of values being read from different data blocks. Therefore, it is not necessary to feed all values into a single large distinct operator such as operator 400. The distinct values of rows from (sets of) data blocks providing disjoint value sets can be computed independently from each other and the results combined. The execution plan of FIG. 4, for instance, uses early duplicate filtering so that only disjoint sets of values enter the distinct operator from each subplan. From data blocks b2 and b7 even only single distinct value is provided (however there are presumably many rows carrying this value). A single distinct operator for all values is likely more expensive than several smaller ones. It requires a larger hash table or must sort more rows. For this reason the present method may push the distinct operator down in the execution plan so that there is a separate distinct operator 501 and 503 for every set of data blocks providing disjoint sets of values. For example, operator 501 may receive only rows or records of data block b1 for finding distinct values in block b1. Operator 503 may receive all records or rows of data block b3 that satisfy the condition 407. In addition, sets of data blocks providing only a single distinct value only require a "limit 1" operation 503 and 507 which returns the first row it encounters—which may be cheaper than full-blown duplicate elimination. For example, operator 505 may receive all records or rows of data block b2 that satisfy the condition 403 and may process those records to find the first record having value attribute=5. The results of each of the operators 501-507 is sent back to the operator 509 UNION ALL that combine the results so as to provide the distinct values for all data blocks b1-b9. FIG. 5 illustrates the execution plan of FIG. 4 after distinct push-down has been applied: There is no global distinct operator. Data blocks b1 and b3 have their own local distinct operator whereas b2 and b7 only require a "limit 1" operation, as they only contribute a single new distinct value each.

In another example, distinct push-down can also be employed if not all distinct values of the zones are known a-priori (see below). It can be employed as soon as two sets of zones can be identified that have disjoint value ranges. As none of the sets of zones contains a row with a duplicate to a row in the other set of zones, no common distinct operator is required and every set of zones can be processed independently. At this, independent processing may include that the system processes all or some of the sets of zones in parallel, e.g., on different computing nodes, processors or CPU cores.

In the following examples of different synopsis techniques are described.

These synopsis techniques may be reasonably applicable for low numbers of distinct values per data block. A system could employ different synopsis techniques for the same column across different data blocks. Moreover, for some data blocks, no attribute value information entries may exist at all. While a-priori pruning of data blocks known not to provide new distinct values from the scan list is only possible, if all distinct values of the data blocks are known. Nevertheless, the iterative approach of described above may be applicable for synopsis techniques providing less information.

If for example attribute value information does not exist for some data blocks (but not all), then these data blocks may be scanned in the first iteration and compute the distinct values. The system then examines the distinct values and eliminates all data blocks from the remaining scan list that are known not to contribute new distinct values.

Extrema

The present method may be applicable if the attribute value information contains the extremum values of the attribute 131B for a set of data blocks. Provided the data type of attribute 131B is enumerable, e.g., integer, date, (small) fixed-length char, . . . , then the system can identify value ranges which the set of distinct values computed so far covers completely. Using the iterative approach described above, the system scans a set of data blocks and computes the distinct values. In the set of distinct values the system identifies ranges of coherent values that are completely covered. The system may then prune all data blocks from the scan list having a min/max range entirely within such a covered value range.

In addition to that, the system may exploit early duplicate filtering for data blocks about which the extrema are known. Let's assume the following scenario:

The range of distinct values r=[a, b] is already contained entirely in the set of distinct values computed so far.

Data block z contains the value range rz=[zmin, zmax].

Without loss of generality: a≤zmin≤b<zmax, i.e., r partly overlaps with rz.

Then the system may scan z, because it may contribute new distinct values between b and zmax. However, the system may add a selection operator that discards rows carrying values ≤b. The same may be possible for every partial overlap the value range of a data block with the set of distinct values computed so far.

Extrema and Bloom Filter

The system could employ a synopsis technique that includes the extremum values of a data block in combination with a Bloom filter that approximates the set of values contained in a data block. The method for determining the attribute value information of a given data block by the Bloom filter comprises inserting each value of the attribute of the given data block into a bit of a bit vector, wherein the attribute value information comprises at least the bit vector.

In addition to the measures described above (under Extrema section), the system may be capable to test for the existence of a particular value in the Bloom filter. Thus if a data block z has been found to overlap partially with the set of distinct values computed so far, then the system may enumerate the remaining non-overlapping values in the min/max range of z and test their existence in the Bloom filter. If none of these values is found in the Bloom filter, then the system may prune z from the scan list. Note that this requires an enumerable column data type.

To give an example: Assuming the synopsis information for z contains zmin=0 and zmax=9 and a bloom filter representing the distinct values in z for column c, and the set of distinct values computed so far is {0, 1, 2, 6, 7, 9}, then the system may enumerate the remaining values in the range of z. If the Bloom filter for z contains none of the remaining values {3, 4, 5, 8}, then the system may prune z from the scan list.

Empty Ranges

A synopsis technique that, in addition to the extremum values, contains a list of empty value ranges of a data block may be used. In addition to the measures described above (under Extrema section), the system may be capable of pruning a data block from the scan list, if the value ranges that do not overlap with the set of distinct values computed so far fall entirely into one or more empty ranges. Note that this requires an enumerable column data type.

In another example a computerized method for determining distinct values of an attribute in a data table in a database management system, where the data table involves the attribute and data records of the data table are stored in a set of data blocks, and attribute value information is provided for each data block, the attribute value information containing information indicating distinct values of the attribute in the data block. The method comprises: maintaining a list of distinct values of the attribute encountered in scanning data records; determining based on the attribute value information and the list of distinct values whether a data block potentially contains further distinct values; excluding a data block from a data record scan in response to the data block not potentially containing further distinct values.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement, the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer program product comprising a computer readable storage medium having a computer readable program for determining distinct values of attributes in a data table in a disk storage device, the data table including multiple rows with each row identified by a data record and multiple columns with each column identified by an attribute, the data table referenced using multiple data blocks, each data block being associated with multiple data records and attribute value information being provided for each data block, the attribute value information comprising information indicating distinct values of the attributes in a respective data block stored therein, wherein the computer readable program, when executed on a computing device, causes the computing device to:

scan a first data block in a set of data blocks of the data table to determine current distinct values from the attribute value information of each of the multiple data records in the first data block;

add the current distinct values from the attribute value information of each of the multiple data records in the first data block and an identification of the first data block to a list of current distinct values of the data table; and for each remaining data block in the set of data blocks:
      responsive to a scan of at least part of the data block indicating at least one distinct value from the attribute value information of each of the multiple data records in the respective data block that is not present in the list of current distinct values of the data table, add the-at least one distinct value from the attribute value information of each of the multiple data records in the respective data block and an identification of data block to the list of current distinct values of the data table; and
      responsive to receiving a query identifying a requested attribute value range, scan only those data blocks in the list of current distinct values of the data table that overlap the received requested attribute value range.

2. The computer program product of claim 1, wherein the computer readable program to add of the current distinct values to the list of current distinct values of the data table further causes the computing device to:
   update the attribute value information of the first data block using the current distinct values.

3. The computer program product of claim 1, wherein the attribute value information further comprises a maximum value and a minimum value of the attribute.

4. The computer program product of claim 1, wherein the computer readable program further causes the computing device to:
sort the remaining data blocks in the set of data blocks of the data table that are not yet processed in descending order from a top to a bottom as a function of a number of distinct values of each data block that are different of the current distinct values of the list; and
select each remaining data block in the set of data blocks based on the sort.

5. The computer program product of claim 1, wherein the computer readable program to add of the current distinct values of the attribute of the first data block to the list further causes the computing device to:
add only values of the current distinct values of the attribute of the first data block that are not part of the list of current distinct values of the data table to the list of current distinct values of the data table.

6. The computer program product of claim 1, wherein the computer readable program further causes the computing device to:
store the list of current distinct values of the data table in a main memory.

7. The computer program product of claim 1, wherein the attribute value information further comprises a minimum value and a maximum value of the attribute, wherein the attribute is an enumerable type, and wherein the computer readable program to determine that the attribute value information of the data block that indicates at least one distinct value that is not present in the list of current distinct values of the data table further causes the computing device to:
identify one or more ranges of coherent values that are completely covered in the list of current distinct values of the data table; and
determine that the data block has a range of values of the attribute that partially overlaps at least one of the identified ranges or that the range of the further data block is not part of the identified ranges.

8. The computer program product of claim 7, wherein the attribute value information of a data block further comprises empty ranges of values of the attribute in the data block, in response to determining that the data block has a range of values of the attribute that partially overlaps at least one of the identified ranges, determining that at least one of the remaining non-overlapping values in not within the empty ranges of the data block.

9. The computer program product of claim 7, wherein the computer readable program further causes the computing device to:
provide a bloom filter technique for determining attribute value information of data blocks of the data table, wherein determining the attribute value information for each data block of the data table comprises encoding each value of the attribute of the each data block into one or more bits of a bit vector, wherein the attribute value information further comprises the bit vector; and
in response to determining that the data block has a range of values of the attribute that partially overlaps at least one of the identified ranges, determine that at least one of the remaining non-overlapping values in the range of values of the data block exists in a bit vector of the data block.

10. A computer system for determining distinct values of attributes in a data table in a disk storage device, the data table including multiple rows with each row identified by a data record and multiple columns with each column identified by an attribute, the data table referenced using multiple data blocks, each data block being associated with multiple data records and attribute value information being provided for each data block, the attribute value information comprising information indicating distinct values of the attributes in a respective data block, the computer system comprising:
a processor; and
a memory coupled to the processor, wherein the memory comprises instructions which, when executed by the processor, cause the processor to:
scan a first data block in a set of data blocks of the data table to determine current distinct values from the attribute value information of each of the multiple data records in the first data block;
add the current distinct values from the attribute value information of each of the multiple data records in the first data block and an identification of the first data block to a list of current distinct values of the data table; and
for each remaining data block in the set of data blocks:
responsive to a scan of at least part of the data block indicating at least one distinct value from the attribute value information of each of the multiple data records in the respective data block that is not present in the list of current distinct values of the data table, add the at least one distinct value from the attribute value information of each of the multiple data records in the respective data block and an identification of data block to the list of current distinct values of the data table; and
responsive to receiving a query identifying a requested attribute value range, scan only those data blocks in the list of current distinct values of the data table that overlap the received requested attribute value range.

11. The computer system of claim 10, wherein the instructions to add of the current distinct values to the list of current distinct values of the data table further cause the processor to:
update the attribute value information of the first data block using the current distinct values.

12. The computer system of claim 10, wherein the attribute value information further comprises a maximum value and a minimum value of the attribute.

13. The computer system of claim 10, wherein the computer readable program further causes the computing device to:
sort the remaining data blocks in the set of data blocks of the data table that are not yet processed in descending order from a top to a bottom as a function of a number of distinct values of each data block that are different of the current distinct values of the list; and
select each remaining data block in the set of data blocks based on the sort.

14. The computer system of claim 10, wherein the instructions to add of the current distinct values of the attribute of the first data block to the list further cause the processor to:
add only values of the current distinct values of the attribute of the first data block that are not part of the list of current distinct values of the data table to the list of current distinct values of the data table.

15. The computer system of claim 10, wherein the instructions further cause the processor to:
store the list of current distinct values of the data table in a main memory.

16. The computer system of claim 10, wherein the attribute value information further comprises a minimum value and a maximum value of the attribute, wherein the attribute is an enumerable type, and wherein the instructions to determine that the attribute value information of the data block that indicates at least one distinct value that is not present in the list of current distinct values of the data table further cause the processor to:

identify one or more ranges of coherent values that are completely covered in the list of current distinct values of the data table; and     determine that the data block has a range of values of the attribute that partially overlaps at least one of the identified ranges or that the range of the further data block is not part of the identified ranges.

17. The computer system of claim 16, wherein the instructions further cause the processor to:

provide a bloom filter technique for determining attribute value information of data blocks of the data table, wherein determining the attribute value information for each data block of the data table comprises encoding each value of the attribute of the each data block into one or more bits of a bit vector, wherein the attribute value information further comprises the bit vector; and     in response to determining that the data block has a range of values of the attribute that partially overlaps at least one of the identified ranges, determine that at least one of the remaining non-overlapping values in the range of values of the data block exists in a bit vector of the data block.

18. The computer system of claim 16, wherein the attribute value information of a data block further comprises empty ranges of values of the attribute in the data block, in response to determining that the data block has a range of values of the attribute that partially overlaps at least one of the identified ranges, determining that at least one of the remaining non-overlapping values in not within the empty ranges of the data block.

* * * * *